Oct. 11, 1927.

B. D. COMYN 1,645,093

OIL SEPARATOR

Filed Oct. 13, 1924

2 Sheets-Sheet 1

B.D. Comyn

INVENTOR

By: Marks & Clerk
Attys

Oct. 11, 1927.

B. D. COMYN 1,645,093

OIL SEPARATOR

Filed Oct. 13, 1924    2 Sheets-Sheet 2

B. D. Comyn
INVENTOR

By: Marks & Clerk Attys

Patented Oct. 11, 1927.

1,645,093

UNITED STATES PATENT OFFICE.

BERNARD DALY COMYN, OF HEBBURN-ON-TYNE, ENGLAND, ASSIGNOR TO WHITE & COMYN, LIMITED, OF HEBBURN-ON-TYNE, ENGLAND.

OIL SEPARATOR.

Application filed October 13, 1924, Serial No. 743,270, and in Great Britain October 24, 1923.

This invention relates to improvements in apparatus for separating liquids of different specific gravities and is particularly applicable for the separation of oil from water. Apparatus of this class is becoming increasingly necessary owing to the use of oil fuel in ships, and to the increasing tonnage of oil tank vessels afloat, and since the tanks on board ship are frequently filled with water ballast, considerable quantities of oil are liable to be lost unless some means is provided for separating the oil from the water in which it is suspended.

The apparatus will now be described with reference to the accompanying drawings, in which:—

Figure 1:
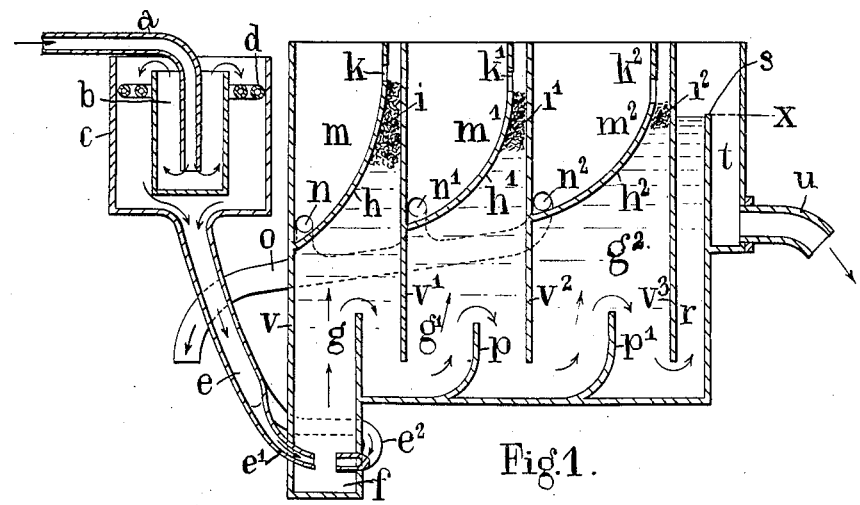
Figure 2:
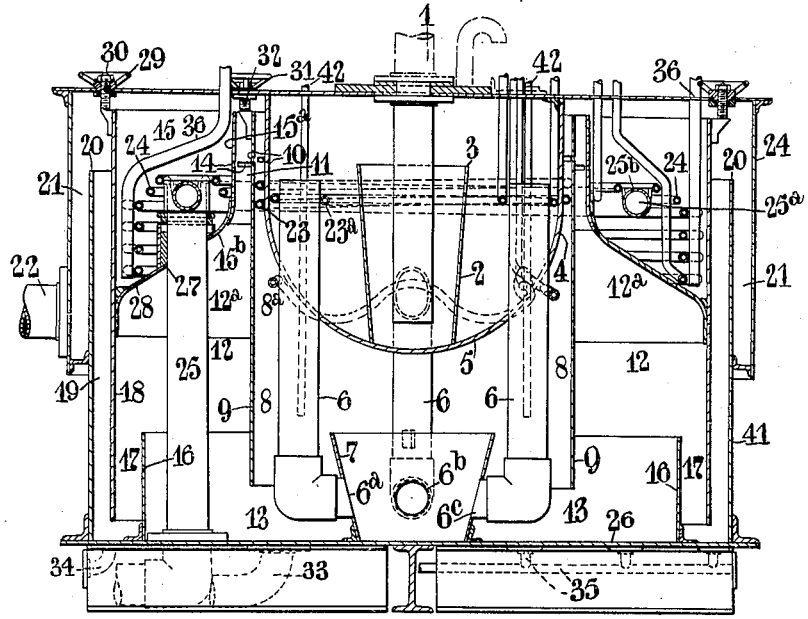
Figure 3:
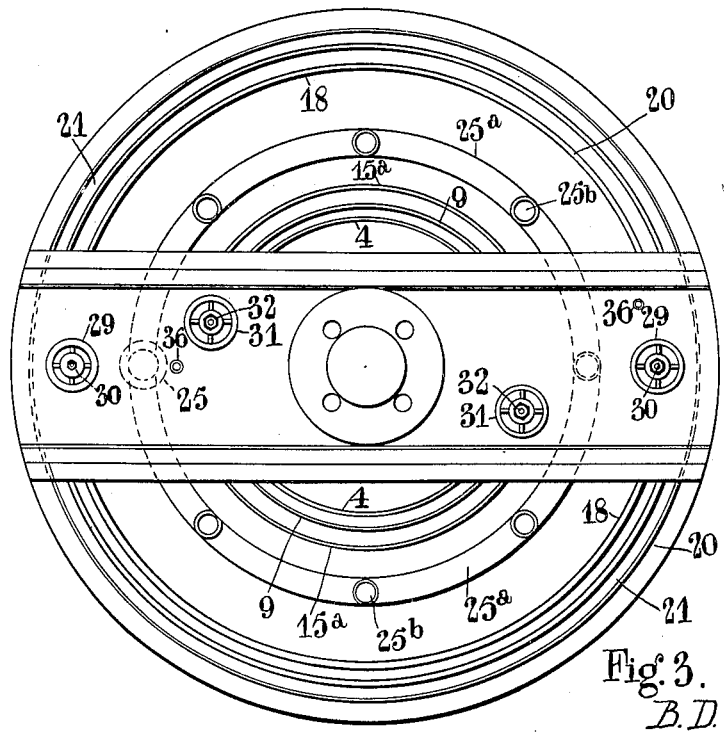

Figure 1 is a diagrammatic view in sectional elevation of one form of the invention, Figure 2 is a vertical section on the line 2—2 of Figure 3 showing another form of the invention, and Figure 3 is a plan of the form shown in Figure 2.

Referring first to the diagrammatic illustration Fig. 1 the oil mixture is delivered by a pipe $a$ into an open topped receptacle $b$ called a flow-steadying chamber, and overflows this flow-steadying chamber into an outer chamber $c$ which may be termed the upper mixture-receiving chamber. There is therefore no hydrostatic connection between the liquids in these two chambers and the detrimental effects of variations in the velocity of the mixture supply, caused possibly by the action of pumps, on the steady conditions necessary throughout the separator are diminished. Heating coils $d$ are preferably provided, in this upper mixture-receiving chamber, to reduce the viscosity of the oil and facilitate the removal of the occluded gases. Solid matter suspended in the mixture falls to the bottom of the upper mixture-receiving chamber and may be prevented from leaving the upper mixture-receiving chamber by any suitable device. The upper mixture-receiving chamber can be made large enough to accommodate possible fluctuations in the delivery of the mixture.

The mixture is led from this upper mixture-receiving chamber through a passage $e$ to a lower receiving chamber $f$ at the bottom of the primary separation chamber $g$, the passage $e$ bifurcating into two oppositely directed inlet ducts $e^1$, $e^2$, admitting mutually-impinging streams of mixture, so that the horizontal components of the velocities in these ducts are mutually destroyed and the mixture enabled to rise with vertical velocity into the primary separation chamber $g$. This vertical velocity decreases as the mixture rises in the primary separation chamber so that the gravitational separation of the oil and water is possible. The mixture impinges against a non-vertical or sloping surface $h$ in the primary separation chamber, oil being thus prevented from being carried downwardly, due to its globules adhering to the surface and the upward velocity of the water being retarded so that the downward gravitational separation is assisted.

The globules adhering to the non-vertical surface coalesce to form larger globules and rise through an upwardly-narrowing passage $i$ so that complete coalescence is effected, the oil then flowing over the weir $k$, arranged at the top of this narrowing passage $i$ into an oil space $m$ from which the separated oil is delivered by way of the outlet $n$ into the common eduction pipe $o$. Heat is supplied in the vicinity of the non-vertical surface to assist the coalescence.

The separated water, possibly containing small globules of oil, falls clear of the rising mixture and passes from the primary separation chamber to a secondary separation chamber $g'$ which it also enters with a vertically upward velocity due to the guide plate $p$. As the globules are small this chamber is made larger than the primary separation chamber $g$ so that a sufficiently low vertical velocity may be obtained to enable separation to be effected. The coalescence of the oil globules is effected in an analogous manner to that adopted in the primary separation chamber, by means of the non-vertical surface $h'$ and narrowing passage $i'$, the oil finally flowing over a weir $k'$, located at the top of the narrowing passage, into the oil space $m'$ to pass thence through the aperture $n'$ to the common eduction pipe $o$.

The water may then be led similarly, and successively, to each of a series of separation chambers, of successively increasing areas. In the example shown in Figure 1 three gravity-separation mixture chambers are provided, the unseparated mixture from the second chamber $g'$ being delivered vertically by help of the guide plate $p'$ to the third chamber $g^2$ having the non-vertical surface $h^2$, upwardly narrowing passage $i^2$, weir $k^2$, oil space $m^2$ and oil outlet $n^2$. The water from the last separation chamber $g^2$ in the series passes from the bottom of the chamber and rises in a passage $r$ to overflow a water weir $s$, arranged below the level of the oil weirs at the top of the separation chambers, whence it passes by way of the duct $t$ to the water discharge pipe $u$.

The separation chambers proper $g$, $g'$, $g^2$, as distinguished from the coalescing spaces $i$, $i'$, $i^2$, are defined by vertical walls $v$, $v'$, $v^2$, $v^3$, the upper prolongations of which form walls for the coalescing spaces.

The heights of the oil weirs in the successive separation chambers, measured above any convenient horizontal datum, successively decrease causing successive increases in the lengths of the columns of water in the successive separation chambers. The water is therefore removed from the separation chambers at successively greater distances from the oil collecting at the top of the chambers, the complete separation of the oil and water being thereby assisted.

In the preferred construction of the apparatus as shown in Figs. 2 and 3 the oil mixture is delivered by the pipe 1 into an open topped receptacle 2, of somewhat conical form which is adapted to neutralize the pulsating effect of the pumps in the delivery of the oil mixture. The oil mixture overflows the lip 3 of this flow-steadying chamber into an outer mixture-receiving chamber 4, the bottom 5 of which is hemispherical and forms an inverted dome as shown, and thence flows through a plurality of symmetrically arranged pipes 6 into a lower mixture-receiving chamber 7, of somewhat conical form, the directed inlets $6^a$, $6^b$, $6^c$ of the pipes 6 being arranged at the same level so that the horizontal components of the velocities of the mutually-impinging streams are destroyed. The mixture rises steadily in this lower receiving chamber 7 and passes at a decreasing velocity into a surrounding space 8 which may be termed the primary separation chamber, the oil separating from the water due to its lower specific gravity. A vertical cylindrical wall 9 surrounds the primary separation chamber and at the top is exterior to the upper mixture chamber 4, the area of the primary separation chamber being reduced at the top $8^a$ by the volume of that part of the upper mixture chamber 4 which depends therein. It will be seen therefore that as the mixture of oil and water issues from the lower mixture-receiving chamber 7 its velocity is being reduced owing to the increasing area it traverses which tends to quiet the action and facilitate the decantation of the oil from the water.

The oil which rises through the diminished area $8^a$ is arranged to pass through weir slots 10 near the top of the wall into a surrounding space 11 which forms the coalescing upper portion of the secondary separation chamber 12. The water separated out in the primary separation chamber 8 passes at 13 under the wall 9 to rise at lower velocity in the secondary separation chamber 12, the smaller percentage of oil still remaining in this mixture rising by way of the upwardly-narrowing annulus $12^a$ whence the separated oil from the primary chamber 8 and from the secondary chamber 12 then passes by way of weir slots 14 into an oil receiving chamber 15. It will be seen that the upper part of the vertical wall, 9, is common to the two upwardly-narrowing coalescing spaces $8^a$ and $12^a$. The slots 10 and 14 thus form two weirs for the separated oil, the slots 10 forming a primary weir and the slots 14 a secondary weir. The secondary separation chamber 12 has an inner wall 16 over which the water passes to an annulus 17, beneath a surrounding plate 18, to rise up the outer annulus 19, over the top lip 20, the separated water finally falling into the water receiving chamber 21 and thence into the separated water discharge pipe 22. The lip 20 this forms a third or water weir.

In order to facilitate the separating action of the oil from the water a series of steam heating coils 23 are disposed in the upper part of the primary separation chamber 8 near the top, and another series of steam coils 24 is disposed in the oil receiving chamber 15 which besides heating the oil in the receiving chamber in order to render it more fluid will also heat the liquid in the upper part of the secondary separation chamber 12 and facilitate the separation therein. The oil finally separated in the oil receiving chamber 15 then passes into a circular collecting pipe $25^a$ and down the oil discharge pipe 25, by way of the aperture $25^b$ (see particularly Figure 3). This oil discharge pipe 25 is secured to the base 26 of the structure and passes through a gland 27 on the base 28 of the oil receiving chamber 15. This oil receiving chamber and its inner wall $15^a$ in which are the slots 14 is adjustable vertically by means of the hand wheels 29 engaging a screwed stud 30 on the top of the wall 18, and similarly the wall 9 in which are the weir slots 10 is adjustable vertically by means of hand wheels 31 engaging a screwed stud 32 on the wall 9. Consequently the oil weirs 10 and 14 are adjustable and by providing that the several outflows of separated oil pass over adjustable weirs or the like, many advantages arise. For example, any required head of oil may be maintained in the primary separation chamber 8 by adjustment of the primary oil weir 10 relatively to the water weir 20, and similarly any required head of oil may be maintained in the secondary separation chamber 12 by adjustment of the secondary oil weir 14 relatively to the water weir 20.

By means of the provision of two or more oil weirs 10, 14 which are adjustable, a difference in the head of the oil obtaining in the primary and secondary chambers can thus be maintained and the necessity for the provision of control valves eliminated because the action of the separator becomes automatic when the correct relative heights of the several oil weirs 10, 14 and the water weir 20 have been once determined. This automatic action is due to the fact that very shallow streams pass over the weirs owing to their large circumferential area and consequently the head of oil is not sufficient to depress the water column below the level of the walls 9 or 18 should oil with a small proportion of water or even oil alone be supplied to the filter as generally happens when the tanks are nearly empty. Thus under no conditions can oil pass over the water weir 20.

Drains 33 and 34 for the chambers 8, 12 and 17 may be provided and a steam pipe 35 for cleaning the apparatus also fitted. A pipe 36 for draining any water that may have accumulated in the oil receiving chamber 15, may be provided. As shown, the apparatus is built up in the form of a series of cylinders 9, 16, 18, 20.

The height of the lip 20 forms a datum line, $x$ (see also Figure 1), the column of water freed from oil in 19, the height of which is determined by this lip, balancing the columns of oil and water mixture in the primary separation chamber 8 and in the secondary separation chamber 12.

Owing to the oil receiving chamber 15 being of large capacity and shallow the chamber acts as a settling tank, and coupled with the action of the heating coils any fractional remainder of water falls to the bottom and may be drawn off by the pipe 36 as described.

The construction is such that the wall 18 and chamber 15 form a unit which can be removed from the containing tank 41, and similarly the wall 9 may be removed. The elements 4, 2, 6 and 7 also form a unit which may be removed, and in this way the whole of the interior of the tank may be removed as three units for overhaul.

Owing to the large circumferential extent of the weirs 10, 14, 20, only a very shallow stream passes over them, even when the apparatus is working at its maximum capacity, and the heights of the oil columns in the primary and secondary separation chambers are practically constant at different uniform rates of working. By causing the oil to pass through slots the lower edges of which form the weirs 10, 14 the lengths of the respective oil columns remain practically constant even when there are marked irregularities in the rates of working since the top of the oil columns can rise momentarily above the upper level of the slots.

In order to prevent oil at low temperature choking up the pipes 6, means such as the steam pipes 42 depending in the pipes 6 may be provided to decrease the viscosity of the oil.

The mixture rises in each separation chamber at a uniform velocity throughout the area of such chamber and at such a speed that the downward separation of water from the mixture is possible, and the mixture in rising impinges against the surfaces 5 and $15^b$ depending into the chambers, coalescence of the separated oil globules being thereby effected. Owing to the slope of the surface 5 and $15^b$ the upper parts of the primary and secondary chambers form narrowing passages which configuration in conjunction with the heating coils assists coalescence of the smaller oil globules in order to effect complete separation of water from the mixture.

I claim:—

1. In apparatus for separating a mixture of liquids of different specific gravities, the combination of a plurality of gravity-separation chambers having vertical walls and their lower parts in operative communication, said chambers being contiguously arranged in series as regards flow of mixture therethrough; upwardly-narrowing ducts for coalescing the lighter liquid so separated forming upward prolongations of said chambers, said upwardly-narrowing ducts being disposed above the level of the communications between said chambers; and means for educting the lighter separated liquid from the tops of said upwardly-narrowing ducts.

2. In apparatus for separating a mixture of liquids of different specific gravities, the combination of a plurality of gravity-separation chambers having vertical walls and their lower parts in operative communication, said chambers being contiguously arranged in series as regards flow of mixture therethrough; upwardly-narrowing ducts for coalescing the lighter liquid so separated forming upward prolongations of said chambers, a wall of certain of said upward prolongations being a vertical continuation of the corresponding wall of said chambers and said upwardly-narrowing ducts being disposed above the level of the communications between said chambers; and means for educting the lighter separated liquid from the top of said upwardly-narrowing ducts.

3. In apparatus for separating a mixture of liquids of different specific gravities, the combination of a plurality of chambers with their lower parts in operative communication, each of said chambers comprising a lower portion having vertical walls and an upper portion converging in an upward direction and means for introducing mixture into the first of said chambers in a vertically upward direction, said means including a plurality of directed inlet ducts admitting mutually-impinging streams of mixture to destroy each other's horizontal velocity.

4. In apparatus for separating a mixture of liquids of different specific gravities, the combination of a plurality of gravity-separation chambers having vertical walls and their lower parts being in operative communication, said chambers being contiguously arranged in series as regards flow of mixture therethrough; upwardly-narrowing ducts for coalescing the lighter liquid so separated forming upward prolongations of said chambers, said upwardly-narrowing ducts being disposed above the level of the communications between said chambers and each duct having a discharge weir for the lighter separated liquid disposed at about the level of the top of said duct.

5. In apparatus for separating a mixture of liquids of different specific gravities, the combination of a plurality of gravity-separation chambers contiguously arranged in series, an operative part of each of said chambers having the form of an upwardly-narrowing duct with a discharge weir for the lighter separated liquid at the top thereof; means for admitting mixture to the lower part of the first of said chambers, said means including a plurality of symmetrically-arranged ducts directed towards a certain point; and a discharge weir for the heavier separated liquid disposed at a lower level than said first-mentioned discharge weir to determine the working head in the apparatus.

6. In apparatus for separating a mixture of liquids of different specific gravities, the combination of a plurality of gravity-separation chambers having vertical walls and their lower parts being in operative communication, said chambers being contiguously arranged in series as regards flow of mixture therethrough; upwardly-narrowing ducts for coalescing the lighter liquid so separated forming upward prolongations of said chambers, said upwardly-narrowing ducts being disposed above the level of the communications between said chambers and each duct having a discharge weir for the lighter separated liquid disposed at about the level of the top of said duct; means for admitting mixture to the first of said chambers; and a discharge weir for the heavier separated liquid disposed at a lower level than said first-mentioned weirs to determine the working head in the apparatus.

7. In apparatus for separating a mixture of liquids of different specific gravities, the combination of a gravity-separation chamber; a primary mixture-receiving vessel disposed within said chamber to leave an intervening upwardly-narrowing passage surrounding said vessel; a tank containing said gravity-separation chamber and said mixture-receiving vessel; and means for leading mixture from said mixture-receiving vessel to a region in said tank disposed below said vessel.

8. In combination with the apparatus claimed in claim 7, means for steadying the flow of incoming mixture, said flow-steadying means being disposed within said primary mixture-receiving vessel.

9. In apparatus for separating a mixture of liquids of different specific gravities, the combination of a primary gravity-separation chamber; a primary mixture-receiving vessel disposed within said chamber to leave an intervening upwardly-narrowing passage surrounding said vessel; a secondary gravity-separation chamber the upper part of which also has the form of an upwardly-narrowing passage and disposed to surround said primary chamber, the inner wall of said secondary chamber being constituted by the outer wall of said first-mentioned passage; a tank containing said primary and secondary chambers and containing also said mixture-receiving vessel; and means for leading mixture from said mixture-receiving vessel to a region in said tank disposed below the said vessel.

10. In apparatus for separating a mixture of liquids of different specific gravities, the combination of a mixture-receiving vessel of circular form; a tank containing said vessel; a weir wall disposed within said tank and surrounding said circular vessel to leave between said wall and vessel a mixture-separating space having the form of an upwardly-narrowing annulus; and means for leading mixture from said mixture-receiving vessel to a region in said tank disposed below said circular vessel.

11. In apparatus for separating a mixture of liquids of different specific gravities, the combination of a mixture-receiving vessel the lower part of which is of a form protuberant downwards; a tank in the upper part of which said vessel is disposed; a cylindrical weir wall within said tank and surrounding said vessel to leave between said weir wall and vessel a mixture-separating space having the form of an upwardly-narrowing annulus; and means for leading mixture from said mixture-receiving vessel to a region in said tank disposed below said vessel.

12. Apparatus as claimed in claim 11, in which the mixture-receiving vessel is of a form convex downwards.

13. In apparatus for separating a mixture of liquids of different specific gravities, the combination of primary and secondary gravity-separation chambers intercommunicating at their lower parts, an operative part of each of said chambers disposed above the level of said inter-communicating lower parts having the form of an upwardly-narrowing duct, said chambers being separated by a vertical wall common to both; means for admitting mixture to said primary chamber and means for educting the lighter separated liquid from the tops of said upwardly-narrowing ducts.

14. Apparatus as claimed in claim 13, in which said vertical wall serves as a weir; together with means for adjusting the height of said weir.

15. In apparatus for separating a mixture of liquids of different specific gravities, a separating chamber defined by a vertical cylindrical wall and a wall convexed downwards disposed within said cylindrical wall to leave between said cylindrical wall and said other wall a mixture-separating space having the form of an upwardly-narrowing annulus and means for introducing mixture into said separating chamber within an area below said convexed wall.

16. In apparatus for separating a mixture of liquids of different specific gravities, the combination of a cylindrical gravity-separation chamber; a circular primary mixture-receiving vessel the bottom of which is formed of an inverted dome depending within said cylindrical chamber to leave an upwardly-narrowing annular space therebetween; a tank containing said gravity-separation chamber and said mixture-receiving vessel; and means for leading mixture from said mixture-receiving vessel to a region in said tank disposed below said dome.

17. In apparatus for separating a mixture of liquids of different specific gravities, the combination of a circular mixture receiving vessel the lower part of which comprises an inverted dome; a cylindrical tank in the upper part of which said vessel is disposed, a cylindrical oil weir wall surrounding said domed vessel and leaving therebetween an upwardly-narrowing annular space, said cylindrical wall dividing said tank into two mixture-separating chambers, a second oil weir wall in said outer separating chamber forming an upwardly narrowing annular space between said first and second weir walls, and a water weir formed by the wall of said tank, as set forth.

18. In apparatus for separating a mixture of liquids of different specific gravities, the combination of inter-communicating primary and secondary gravity-separation chambers, each of said chambers comprising a lower portion having vertical walls and an upper portion converging in an upward direction, certain walls of said chambers serving as weirs for the discharge of the lighter separated liquid; a discharge weir for the heavier separated liquid; together with means for adjusting the relative heights of said weirs.

19. In apparatus for separating a mixture of liquids of different specific gravities, the combination of intercommunicating circular primary and secondary gravity-separation chambers, each of said chambers comprising a lower portion having vertical cylindrical walls and an upper portion having the form of an upwardly-narrowing annulus, certain walls of said chambers serving as weirs for the discharge of the lighter separated liquid; a discharge weir for the heavier separated liquid; together with means for adjusting the relative heights of said weirs.

20. In apparatus for separating a mixture of liquids of different specific gravities, the combination of a plurality of gravity-separation chambers disposed one within another and with their lower parts in operative inter-communication; means for admitting mixture to the innermost of said chambers; means for educting the lighter liquid separated in said chambers; and a weir wall disposed exteriorly of said chambers for the discharge of the heavier separated liquid.

21. In apparatus for separating a mixture of liquids of different specific gravities, the combination of a plurality of gravity-separation chambers disposed one within another and with intercommunications connecting their lower parts operatively together; means for admitting mixture to the innermost of said chambers to pass to said next surrounding chamber; a weir wall for each of said chambers for the lighter liquid; means for educting the lighter liquid separated in said chambers; and a weir wall disposed exteriorly of said chambers for the discharge of the heavier separated liquid, the difference between the heights of the weir walls being sufficient to balance a column of lighter liquid the length of which is less than the height of the weir wall above the intercommunications between said chambers.

22. In apparatus for separating a mixture of liquids of different specific gravities, the combination of a plurality of intercommunicating chambers having a common axis, each chamber comprising a lower portion having vertical walls and an upper portion converging in an upward direction; flow-steadying means disposed within the innermost of said chambers and symmetrically disposed about said common axis and means also disposed symmetrically about said common axis for leading mixture from said flow-steadying means to an axially-disposed region of said innermost chamber.

In testimony whereof I affix my signature.

BERNARD DALY COMYN.